Figure 3:
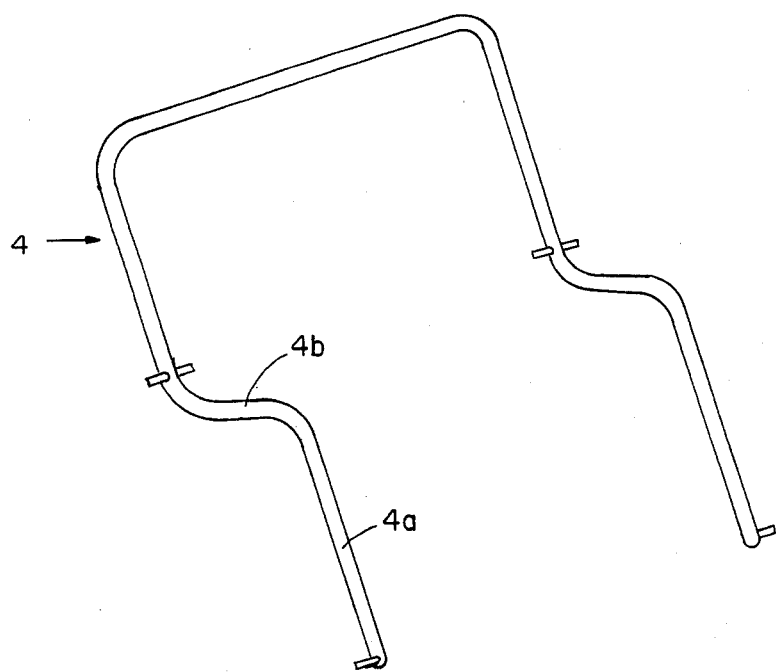

United States Patent [19]

Leitermann et al.

[11] Patent Number: 4,519,646
[45] Date of Patent: May 28, 1985

[54] REARWARD FACING COLLAPSIBLE VEHICLE BACK SEAT

[75] Inventors: Wulf Leitermann, Bad Wimpfen; Rolf Heneka, Bad Friedrichshall, both of Fed. Rep. of Germany

[73] Assignee: Audi NSU Auto Union Aktiengesellschaft, Fed. Rep. of Germany

[21] Appl. No.: 444,450

[22] Filed: Nov. 24, 1982

[30] Foreign Application Priority Data

Dec. 2, 1981 [DE] Fed. Rep. of Germany ....... 3147656

[51] Int. Cl.³ ............................................. B60N 1/02
[52] U.S. Cl. ................... 297/15; 296/65 R; 296/69; 297/335; 297/378; 297/417
[58] Field of Search .................. 297/14, 15, 331, 335, 297/336, 378, 379, 417; 296/63, 65 R, 69

[56] References Cited

U.S. PATENT DOCUMENTS

| | | | |
|---|---|---|---|
| 511,533 | 12/1893 | Lard | 297/331 X |
| 1,522,225 | 1/1925 | Birmingham | 297/336 |
| 1,581,008 | 4/1926 | McNair | 297/336 |
| 1,662,378 | 3/1928 | Duke | 297/331 X |
| 2,146,932 | 2/1939 | Boman | 297/417 X |
| 3,097,881 | 7/1963 | Aguilar | 296/69 X |
| 3,290,090 | 12/1966 | Ford | 297/378 X |
| 3,301,596 | 1/1967 | Eos | 297/417 X |
| 3,703,312 | 11/1972 | Chapman | 297/15 X |
| 3,746,389 | 7/1973 | Fourrey | 297/15 |
| 4,443,034 | 4/1984 | Beggs | 296/65 R |

FOREIGN PATENT DOCUMENTS

| | | | |
|---|---|---|---|
| 2624947 | 12/1977 | Fed. Rep. of Germany | 296/63 |
| 1452002 | 9/1966 | France | 297/378 |
| 628078 | 8/1949 | United Kingdom | 297/15 |
| 2068216 | 8/1981 | United Kingdom | 297/373 |

Primary Examiner—Francis K. Zugel
Assistant Examiner—James R. Brittain
Attorney, Agent, or Firm—Kane, Dalsimer, Kane, Sullivan and Kurucz

[57] ABSTRACT

A rear facing vehicle back seat includes back section (2) supported by a U frame (4), having two limbs (4a) which extend along opposite sides of the seat section (1) and the back section (2), the bottom ends of these limbs being mounted in pivot bearings (5) on the side walls of a floor cavity (6) which accommodates the seat when out-of-use. The seat section (1) is also pivoted on the same bearings (5). In the operative position, into which the entire vehicle back seat can be shifted in one movement, the space underneath the seat can be used as a storage space, or the greater part of the whole length of the cavity can be fully utilized as a loading space for bulky articles after the seat section has been folded up.

7 Claims, 3 Drawing Figures

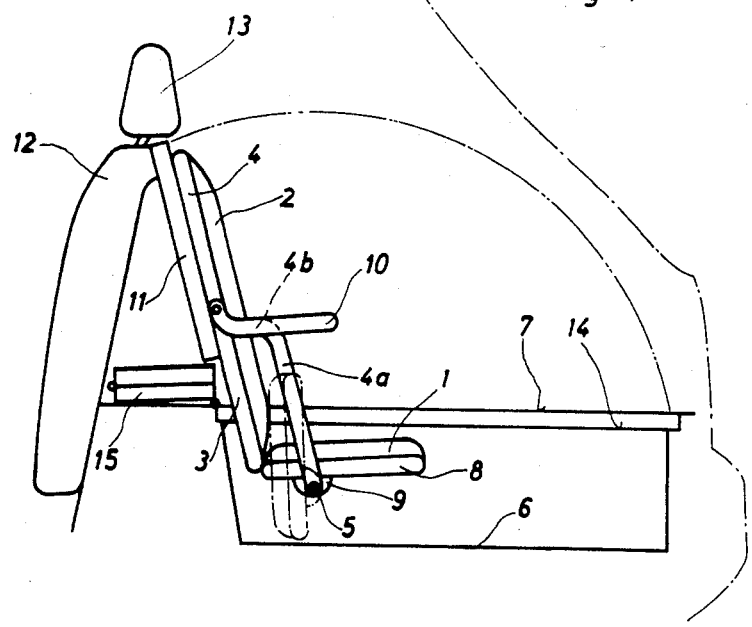

REARWARD FACING COLLAPSIBLE VEHICLE BACK SEAT

This invention relates to a rearward facing vehicle back seat of the type designed to be folded away when not in use, so as to leave space clear for loading or other purposes.

A vehicle back seat of this type, such as is known, for example, from German Auslegeschrift No. 28 43 667, is used in motor transport vehicles having a loading area designed for accommodating larger articles, and also for accommodating additional passengers after the seat has been converted from its out-of-use into its operative position. In existing constructions the back seat is connected to the bodywork in an elaborate and expensive manner by a number of pivot bearings, and to convert the seat from its operative position into the out-of-use position, or vice versa, the seat section and the back section need to be individually actuated and swivelled. Moreover in the prior construction the front edge of the seat section is connected to a cross-piece running across the seat storage cavity, but the cross-piece interrupts access to the cavity and impairs free loading: in the operative position of the seat the space beneath the seat section for accommodating additional loads is restricted, and the cavity cannot be fully utilized for loading particularly bulky articles.

An object of the invention accordingly is to provide an improved vehicle back seat of the type referred to above, which will be simple in construction and in which the available loading space can be better utilized.

Broadly stated the invention consists in a rear facing vehicle back seat comprising a seat section and a back section, which are arranged to pivot from an operative position into an out-of-use position in a cavity in the floor of the vehicle body, and whose reverse sides, in the out-of-use position, form part of a loading surface, and including a generally U shaped frame which supports the back section, and has limbs extending along opposite sides of the back section and of the seat section, the bottom ends of the limbs being mounted in pivot bearings having a common pivot axis extending across the cavity, the seat section also being pivotally mounted on the same axis, and so arranged that its rear edge lies adjacent to and abuts against the bottom edge of the back section in the operative position of the seat. In a seat constructed in accordance with the invention it is possible to dispense with the cross-piece previously located in the storage cavity, thus providing an open substantially continuous cavity which can be fully used as an enlarged extra loading space. This means that the cavity space beneath the seat section can be used in the operative position of the seat as a readily accessible collecting space for accommodating additional loads. Moreover in preferred forms of the invention the seat section can be pivoted against the back section when in the operative position, and as a result the seat occupies a particularly small volume, so that the greater part of the entire length of the cavity is available for loading particularly bulky, large and higher articles. A further advantage lies in the ease of handling, which is attributable to the fact that the whole vehicle back seat can be shifted into its operative or out-of-use position merely by pivoting the U frame, whereas the seat section, which remains largely inside the cavity, does not have to be specially actuated.

To ensure that after the pivotal movement of the U frame from the out-of-use position into the operative position the seat section always automatically adopts the correct position for the user, the seat section is preferably mounted on the swivel bearings on an axis located between its centre and its edge which lies adjacent to the back section. As a result there is a shift in the centre of gravity but with this construction it is also possible to arrange that the seat section, when required, will remain naturally in place folded up against the back section.

In one preferred construction according to the invention the seat section has a square seat frame acting as a cushion support, with two downwardly pointed brackets for mounting on the pivot bearings. This provides a light and simple structure, or alternatively the U frame may be arranged to carry a square support frame serving as a cushion support for the back section.

To provide the desired degree of comfort for an occupant of the vehicle back seat, the U frame is preferably arranged with its limbs running parallel to the sides of the back section and also each limb has a substantially horizontal section, one on each side, roughly at the level of the elbows of an occupant. This design can be further improved by a pivotal arm rest located on each of the limbs of the U frame, the arm rest butting against the substantially horizontal section of the respective limb in the operative position.

In the out-of-use position of the seat the loading surface of the loading space is entirely formed by the reverse side of the back section and to improve the loading surface a cover plate may be provided to cover the seat section in its out-of-use position, the cover plate being capable of folding and of forming a part of the loading surface.

The invention may be performed in various ways and one specific embodiment will now be described by way of example with reference to the accompanying drawings, in which:

FIG. 1 is a diagrammatic longitudinal section through the rear part of a vehicle with a vehicle back seat according to the invention in its erected position, with an adjacent back seat back rest, and FIG. 2 is part of a longitudinal section as in FIG. 1, with the vehicle back seat in the stowed position.

In FIG. 1 is shown a rear facing vehicle back seat for a co-driver or other passenger, which is pivotally mounted in the rear part of a motor vehicle illustrated only in a simplified form. The vehicle back seat essentially comprises a seat section 1 and a back section 2. The back section 2 has a square back rest frame 3 which acts as a cushion support, and is carried by a substantially U shaped frame 4. The U shaped frame 4 has side limbs 4a, which extend downwards on both sides of the seat section 1 and the back section 2, and the lower ends of these limbs are mounted in pivot bearings 5 positioned on the side walls of a cavity 6 in the floor 7 of the vehicle body, the common pivot axis running at right angles across the cavity 6. The seat section 1 has a square seat frame 8 acting as a cushion support, with two downwardly extending brackets 9, by means of which the seat section 1 is mounted on the pivot bearings 5, the brackets 9 being located between the center of the seat and its rear edge adjacent the back section 2, and directed downwards from the seat frame 8. As shown in the drawing the center of gravity of the seat section 1 thus lies to the right of the pivot bearings 5, so that the seat section 1 naturally and automatically lies with its back edge facing and adjacent to the bottom edge of the back rest frame 3.

On the limbs 4a of the U frame 4 are located arm rests 10 which can be pivoted on both sides of the back section 2, and which are roughly on a level with the elbows of an occupant of the seat in the operative position shown in FIG. 1. Level with the arm rests 10, the limbs 4a of the U frame 4 extend to each side in a mainly horizontal section 4b, and form a support for the arm rests 10, which are, for example, U shaped in cross-section. In the operative position as illustrated, the back section 2 of the seat lies upright with a cover plate 11 fixed against its reverse side and abutting against the top of a fixed back rest 12, the plate being connected to the latter by catch arrangements which are not illustrated in detail. A head rest 13 located on the back rest 12 likewise serves as a head support for an occupant of the seat in this operative position. From the illustration it can readily be seen that the space underneath the seat section 1 has easy access and can be used as a receiving space for additional loads.

If the cavity 6 is to be used for accommodating bulky loads, the seat section 1 can be swivelled into the position indicated in chain lines, in which it will naturally remain as a result of being mounted by means of the brackets 9. As the arms 4a of the U frame 4 are mounted at the side of the cavity 6, the loading space of the cavity 6 is not restricted, and indeed provision is made for the arm rests 10 to be similarly folded upwards if required.

FIG. 2 shows how the complete vehicle back seat has been shifted into its out-of-use position into the cavity 6 by swivelling the U frame 4 about the pivot bearing 5 along the arc shown in chain lines (in FIG. 1), in which position the cover plate 11 fixed against the reverse surface of the back section 2 fits into a recess 14 surrounding the cavity 6, and forms a part of the loading surface of the loading space. The seat section 1, which does not need to be separately actuated, adopts roughly the position shown. As the cover plate 11 connected to the back section 2 covers only one part of the cavity 6, the remaining part of the cavity above the seat section 1 is closed by a two-piece cover plate 15, connected together and to the vehicle body by hinges.

The cover plate 15 in FIG. 1 lies folded up between the vehicle back seat and the back rest 12. Because of the space-saving method of construction, the clear space of the cavity 6 can be used to accommodate loads also in the out-of-use position of the seat.

The proposed vehicle back seat of the invention, with its simple and practical construction, is not confined merely to the embodiment illustrated as an example. For instance the cover 15 may be connected through one of its parts to the adjacent cover plate 11 by means of a further hinge. It is also possible for the cover plate to be constructed from several horizontally running bars which are connected together in the manner of a roller blind, which can be rolled away from the cavity 6 before the swivelling seat movement into the operative position takes place.

We claim:

1. A rear facing vehicle back seat construction including a cavity in the floor of the vehicle having side walls provided with pivot bearings on a common transverse axis, and comprising a seat section and a back section which are arranged to pivot independently from an operative position to an out-of-use position in said cavity, a generally U-shaped frame which supports said back section and has limbs extending along and beyond opposite sides of said back section and said seat section; said limbs having, as seen in the operative position, upright upper portions defining a first plane and lower portions lying in a second plane which is substantially in parallel but offset from said first plane and connected to said upper portion by a substantially horizontal portion arranged to lie roughly on a level with the elbows of an occupant of the seat, the bottom ends of said lower portions of the limbs being mounted in said pivot bearings in said cavity, said seat section also being pivotally mounted on the transverse axis between a seat center and a seat edge disposed adjacent to the back section, said seat section abutting with said edge the bottom of the back section in the operative position, said back section forming a load-carrying surface by covering said cavity in said out-of-use position.

2. A vehicle back seat as claimed in claim 1, including a pivotable arm rest arranged on each of said limbs, each arm abutting against said substantially horizontal portion of the respective limb in the operative position of the seat.

3. A vehicle back seat as claimed in claim 2, wherein each of said arm rests has a U-shaped cross section open towards said substantially horizontal portion.

4. A vehicle back seat construction as claimed in claim 1 wherein said first and second planes are offset by a distance less than the spacing between said transverse axis and said floor.

5. A vehicle back seat construction as claimed in claim 4 wherein said back section is provided with a plate which forms said load carrying surface.

6. A vehicle back seat construction as claimed in claim 5 further comprising a cover which cooperates with said plate to close said cavity.

7. A vehicle back seat construction as claimed in claim 6 wherein said floor is provided with a recess arranged and constructed to hold said plate flush with said floor.

* * * * *